United States Patent [19]

Humphrey et al.

[11] Patent Number: 4,526,195

[45] Date of Patent: Jul. 2, 1985

[54] REINFORCED PLASTIC STRUCTURE SUCH AS A VALVE

[75] Inventors: Frederick H. Humphrey; Brock H. Humphrey, both of Markham, Canada

[73] Assignee: IIC Mechanical Products Limited, Dowsview, Canada

[21] Appl. No.: 508,282

[22] Filed: Jun. 27, 1983

Related U.S. Application Data

[63] Continuation-in-part of Ser. No. 207,931, Nov. 18, 1980, abandoned.

[51] Int. Cl.³ .............................................. F16K 15/00
[52] U.S. Cl. ............................ 137/512.1; 137/516.13; 251/366; 251/368; 428/64; 428/113; 301/63 R
[58] Field of Search ............... 137/512, 512.1, 512.15, 137/516.13; 251/366, 367, 368; 428/64, 113; 301/63 R

[56] References Cited

U.S. PATENT DOCUMENTS

| | | | |
|---|---|---|---|
| 486,600 | 11/1892 | McGowan | 137/516.13 |
| 1,012,359 | 12/1911 | Iversen | 137/516.13 |
| 1,081,803 | 12/1913 | Alley et al. | 137/516.13 |
| 1,244,286 | 10/1917 | Breinl | 137/516.13 |
| 1,444,790 | 2/1923 | Holman | 137/516.13 |
| 1,909,974 | 5/1933 | Longacre | 137/516.13 |
| 3,369,843 | 2/1968 | Prew | 301/63 R |
| 3,536,094 | 10/1970 | Manley, Jr. | 137/512.1 |
| 3,917,352 | 11/1975 | Gageby | 301/63 R |
| 4,252,588 | 2/1981 | Kratsch et al. | 428/113 |
| 4,307,751 | 12/1981 | Mayer et al. | 137/516.13 |

Primary Examiner—Martin P. Schwadron
Assistant Examiner—John A. Rivell
Attorney, Agent, or Firm—George A. Rolston

[57] ABSTRACT

A valve structure having a seating member defining at least one valve opening, and having an outer body portion, a center core portion, and a plurality of arms extending from the center core to the outer body, there being seating means formed on the outer body and the center core for receiving valve closure means, the outer body and center core and the arms all being formed integrally in a single homogeneous structure having groups of reinforcing fibres extending from the center core through the radial arms into the outer body, the reinforcing fibres being embedded in and completely surrounded by a mouldable plastic resin material, and spring receiving blocks formed integrally with such arms, and spring recess formed in such bosses offset from such reinforcing fibres without interruption of such fibres.

11 Claims, 11 Drawing Figures

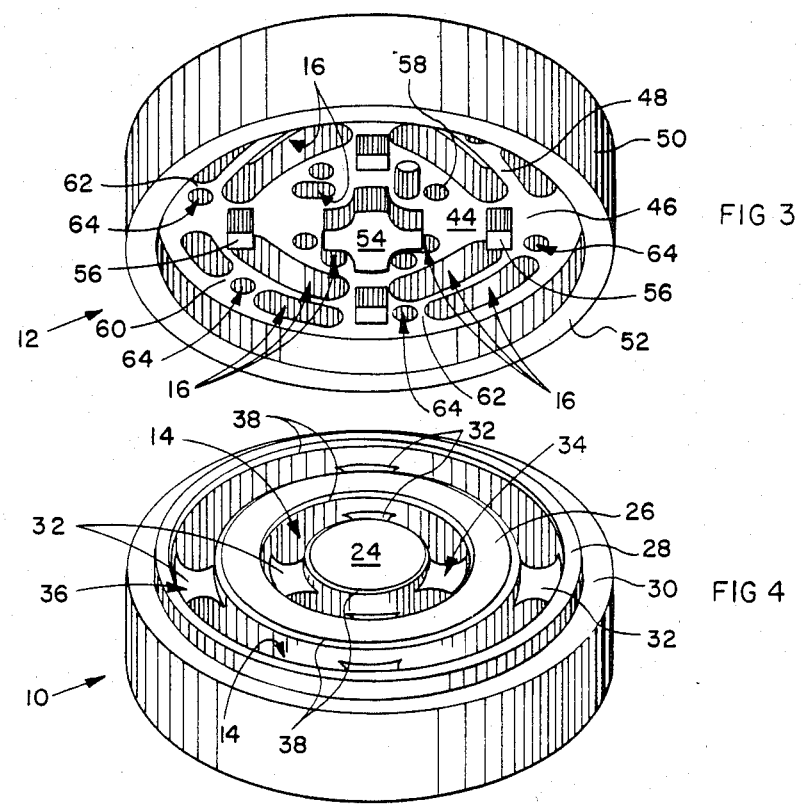
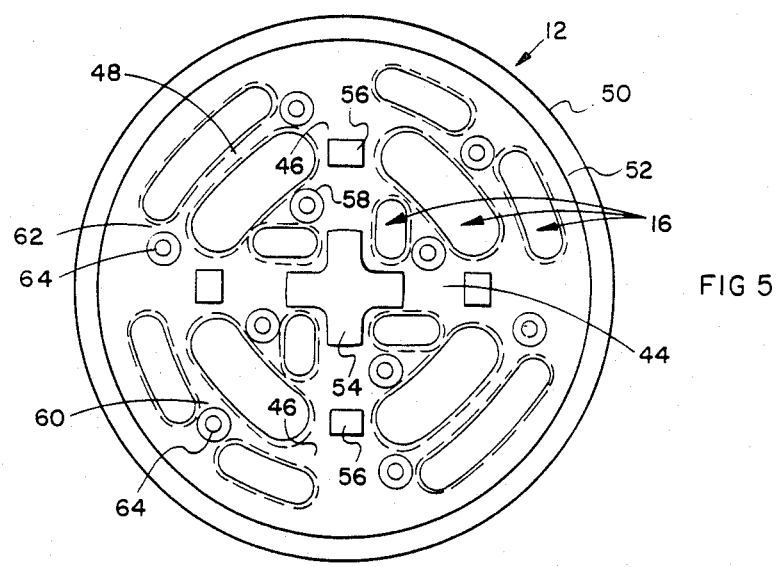

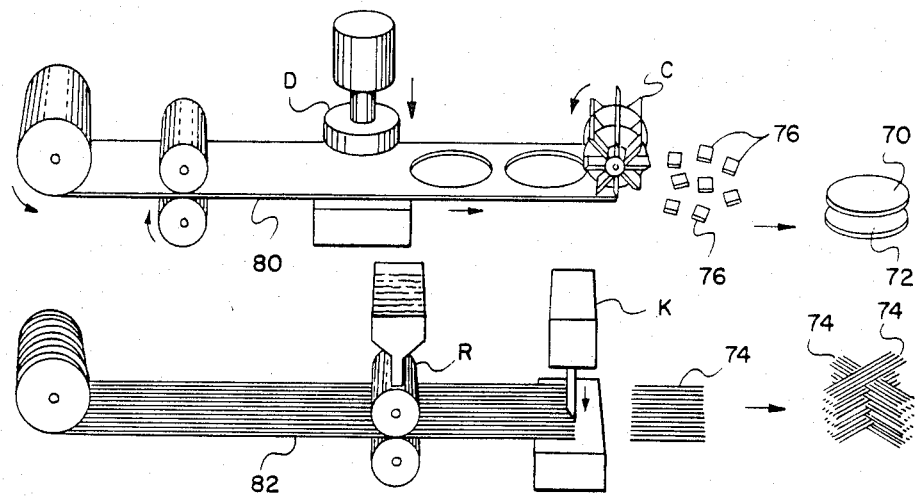
FIG 8
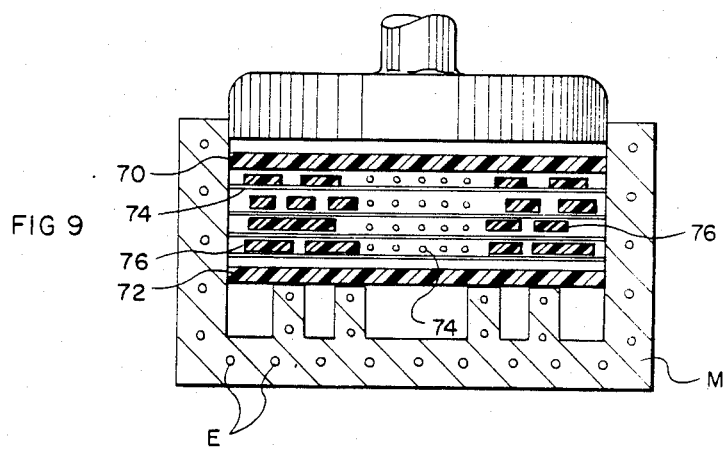
FIG 9
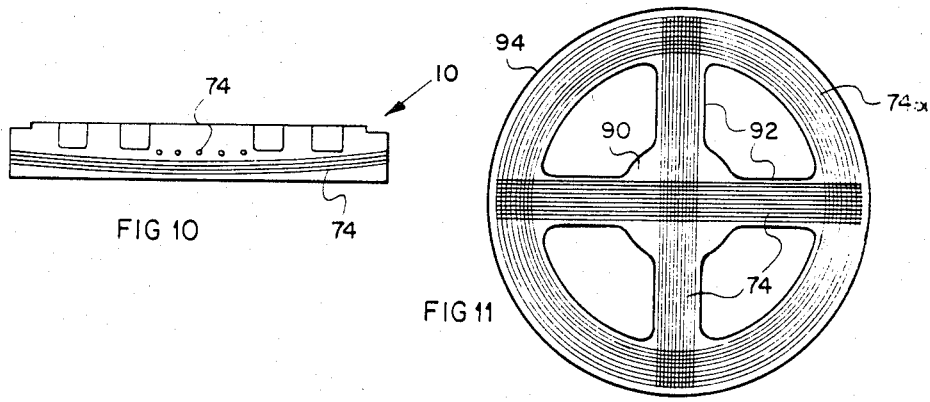
FIG 10
FIG 11

REINFORCED PLASTIC STRUCTURE SUCH AS A VALVE

This application is a Continuation-in-Part of application Ser. No. 207,931, now abandoned entitled "Reinforced Plastic Structure such as a Valve".

The invention relates to self-actuating valves such as are used in compressors, and in particular, to such valves made of synthetic plastic materials.

BACKGROUND OF THE INVENTION

Self acting valves are used in compressors, and in other applications. Such valves simply comprise a body and a valve closure member which is spring actuated into a closed position, and is adapted to lift off its seat on a predetermined pressure differential across the valve.

Such valves, particularly when used in compressors, are subjected to continuous duty operation twenty-four hours a day in many cases and are subject to heavy wear. The stresses imposed on such valves during operation are very considerable. As a result they break down frequently, and the replacement and maintenance of such valves is a continuous problem.

Valves of this type have always been made of metal such as steel, and are usually machined out in complex shapes requiring many hours of costly machining. Consequently, they represent a substantial cost in the operation of for example compressors. In addition, it is well known that even when manufactured of steel, such valves can simply shatter in normal use. This occurs when for example liquids or solids are entrained with the gases being compressed. The gases entering the valve may be moving at a very high velocity, and the matter entrained with such gases will also be moving at the same velocity. When such matter strikes an obstruction such as a valve body, the valve body is subjected to enormous stresses and breaks into pieces. Such pieces then enter directly into the cylinder, and the piston and cylinder become seriously damaged. As a result, the entire unit is subject to costly repair and downtime.

In addition to these disadvantages of existing valves, it is well known that the design of the porting in the valves is a critical factor in achieving the most efficient operation. It is obvious that such porting must be arranged in the best possible fashion so as to minimize obstruction to gas flow through the ports and thus achieve the maximum efficiency in the operation of the compressor. One of the factors affecting the efficiency of such valves and valve ports is the provision of fairing or radiussing around the entrances and exits to the valve ports, and also in the provision of a valve closure member of an optimum design.

In the past, when using an all metal construction for the valve body, the radiussing of all of the valve ports, arouhd their entrances and exits, while being desirable, has not been practical from the viewpoint of economy in view of the additional machining time involved.

For all of these reasons therefore it is desirable to manufacture the valve bodies in an entirely different way, with machine time reduced to a minimum. In addition, it is desirable to manufacture such valve bodies out of a material which, in the event of the valve body becoming shattered, e.g. by impact of entrained matter such as liquids and solids moving with the gases at high velocity, does not break up the pistons and score the cylinder walls of the compressor.

One proposal for an improved valve is shown in U.S. Pat. No. 3,536,094. In that proposal the valve closure members were annular bodies of plastic material. The valve bodies were made of steel. Thus breakage of the closure members did not cause such serious consequences. Pieces of plastic entering the cylinders would not score the cylinder walls or damage the piston in the same way as pieces of steel. However, the valve bodies were still made of steel, and in the event that a portion of the valve body was broken, then the same consequences would follow as described above. However, this form of valve incorporated certain inherent problems of its own. Thus the coefficient of expansion of the plastic material is three times greater than that of steel. As the valve is subjected to increases in temperature, then the annular closure members tend to expand, and do not form a perfect seal with the seating portions of the valve body.

For all of these reasons therefore, it is apparent that it is desirable to fabricate the valve body portions of the valve of some material other than steel, and to fabricate the valve body portions and the valve closures out of material having the same or substantially the same coefficients of expansion, so as to avoid the problems described above, while yet incorporating standing the extreme stresses developed in normal operation.

The invention seeks to overcome the various disadvantages described above by the provision of a valve structure of the type comprising a seating member defining at least one valve opening therethrough, and a closure member, said seating member comprising, an outer body portion, a center core portion, a plurality of arms extending from said center core portion to said outer body portion, seating means formed on said outer body portion and said centre core portion for reception of said closure means thereon, said outer body portion and centre core portion and said arms all being formed integrally in a single homogeneous structure of synthetic plastic materials having reinforcing fibres extending from said centre core through said radial arms into said outer body, said reinforcing fibres being embedded in and completely surrounded by a mouldable plastic resin material.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 3 is a lower perspective of an upper portion of such valve structure;

FIG. 4 is a upper perspective of a lower portion of the valve structure;

FIG. 5 is a bottom plan view of the top portion of FIG. 3;

FIG. 8 is a schematic diagram showing the various steps and the assembly and moulding of components;

FIG. 9 is a schematic elevational view partly in sections, showing the assembly of the various components in a mould;

FIG. 10 is a schematic section view in elevation showing a modification, and,

FIG. 11 is a schematic top plan view of further embodiment of the invention.

DESCRIPTION OF A SPECIFIC EMBODIMENT

Figure 1:
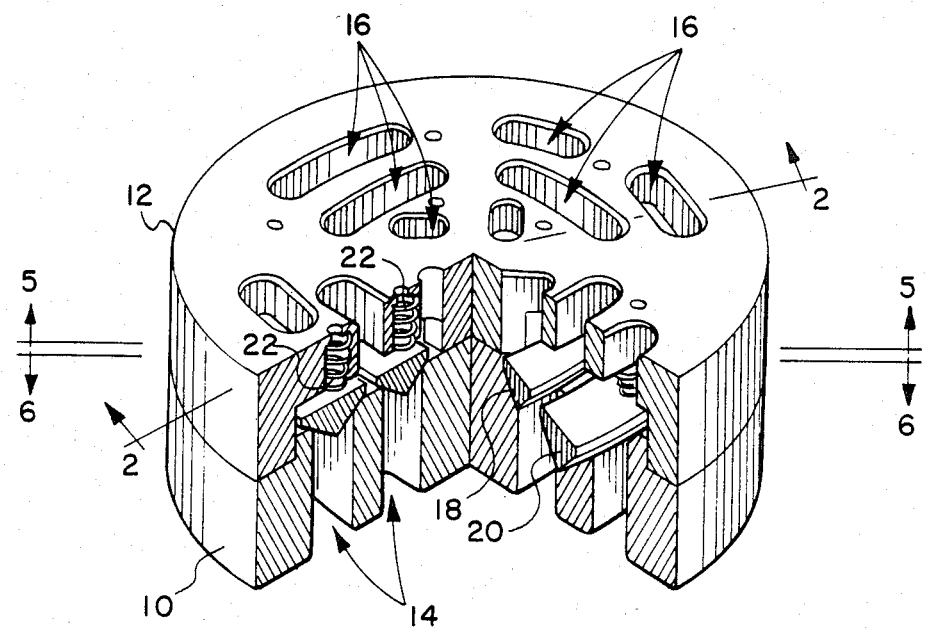
FIG. 1 is a perspective illustration of a valve manufactured in accordance with the invention, partially cut away.

Referring first of all to FIG. 1, it will be seen that the embodiment of the invention illustrated there comprises a valve of the type suitable for use in compressors. It will be understood that such valves are used in pairs, one valve functioning as an inlet and the other as an exhaust. They are usually placed in position in a compressor block or head (not shown) and are held in position by any suitable clamping means (not shown) which may be releasable, so that the valves may be removed and replaced for servicing.

These features are well known in the art, and form no part of the invention and are therefore omitted for the sake of clarity.

The valve will be seen to comprise a seating portion 10, and a spring bearing portion 12, being of generally cylindrical shape in plan. The seating portion 10 is provided with a plurality of gas passageways 14, and the spring bearing portion is provided with a plurality of gas ports 16. The seating portion and spring bearing portion enclose between them two valve closure rings 18 and 20 which are of a generally annular shape in plan, and which are dimensioned and adapted to close off the passageways 14. The rings 18 and 20 are movable, and are held in position by means of springs 22, located in the spring bearing portion 12.

Assuming that the valve of FIG. 1 is used as an intake valve in a compressor, then the valve seating portion 10 will be connected with the incoming supply of gas, and the spring bearing portion 12 will be connected with the compressor.

As the piston in the compressor causes the development of a reduced pressure, then the pressure difference between the gas supply, on the one side of the valve and the reduced pressure in the compressor on the other side of the valve, will cause the closure rings 18 and 20 to move against the springs 22, thereby opening the passageways 14 and permitting flow of gas through passageways 14 around rings 18 and 20 and into ports 16 and thus into the compressor. Continued movement of the piston will cause such gas flow to continue until such time as the cylinder is charged at which time the pressure difference will disappear, and the springs 22 will thus return the rings 18 and 20 into sealing engagement and gas flow will cease.

As explained above, the velocities experienced in such valve operation are very high. Any material entrained in such gas supply whether of a liquid or a solid nature, will impact at high speed upon either the seating portion 10 or the rings 18 and 20 or even on the spring bearing portion 12. Such an impact frequently causes shattering of the parts. In the past, where such parts were made either wholly or partially of steel, the shattered steel fragments were carried directly into the cylinder, and damaged the piston and cylinder walls.

In the present invention, both the seating portion 10 and spring bearing portion 12 and rings 18 and 20 are made of synthetic plastic material, in a manner to be described below, so that the only metal components are in fact the springs 22.

As shown in more detail in FIGS. 2 to 6, the present embodiment of the invention is seen to comprise a valve seating portion 10 having a central core 24 of generally cylindrical shape, and intermediate seating ring 26, and an outer ring 28. Outer ring 28 is provided with a stepped shoulder 30 for reasons to be described below. The core 24, ring 26 and ring 28 are all united together in a single integral structure by means of radial arm members 32 which extend from core 24 to intermediate ring 26 and then on to outer ring 28. In the embodiment shown, four such arms 32 are illustrated. It will however be appreciated that this is not limiting, and other numbers of such arms 32 may be provided.

It is also noted that only one intermediate ring 26 is shown. It will of course be appreciated that more such intermediate rings may be provided, concentric with one another and concentric with core 24 if a larger valve structure is desired. On the other hand in a much smaller valve structure it may be desirable to dispense with the intermediate ring 26 altogether, in which case the radial arms 32 would simply extend from the centre core 24 to the outer ring 28.

It will also be noted that the radial arms 32, when viewed in section are of a reduced height in relation to the height of the centre core 24, intermediate ring 26 and outer ring 28. In this way, the core 24 and rings 26 and 28 define between them continuous annular spaces or grooves indicated as 34 and 36, and uninterrupted by the radial arms 32. The gas passageways 14 which are defined between the radial arms 32, communicate with the continuous annular grooves 34 and 36, for free flow of gases therethrough. Angled valve seating surfaces 38 are formed on the core 24 and rings 26 and 28 as shown for reception of the valve closure rings 18 and 20 described above. The valve closures 18 and 20, are generally triangular in cross-section, having two angled upstream surfaces 40 forming a V-shape, and having a generally flat planar downstream surface 42, for engagement by springs 22. The two upstream surfaces 40 rest on the valve seating surfaces 38, and preferably meet at an angle between about 80 and 100 degrees. A substantial portion of the closure rings 18 and 20 thus extends downwardly into the annular grooves 34 and 36. The radial arms 32, being of reduced height, leave a substantial free space all around such annular grooves. In this way when the valve is open the two surfaces 40 of rings 18 and 20 smoothly divide the gases flowing through grooves 34 and 36 into two streams, with a minimum of turbulence, thus maximizing the efficiency of the valve.

Figure 2:
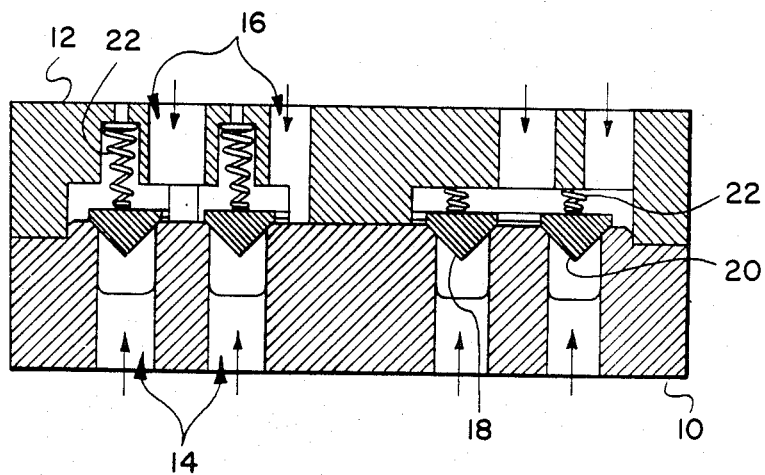
FIG. 2 is a section along the line 2—2 of FIG. 1.
Figure 6:
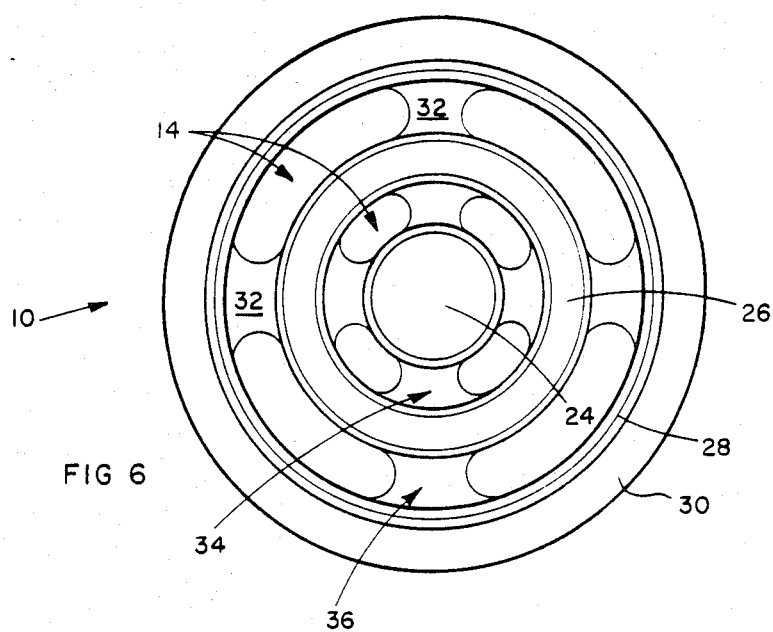
FIG. 6 is a top plan view of the bottom portion of FIG. 4.

As best shown in FIGS. 3 and 5, the spring bearing portion 12 of the valve is constructed on a generally similar principle to the seating portion 10. Thus it comprises a centre core portion 44, four radial arms 46 extending therefrom, and intermediate ring 48 supported by the radial arms 46, and an outer ring 50. It will be noted that the core 44 arms 46 and intermediate ring 48 are all of the same thickness in section, and that the outer ring 50 is of a greater thickness, defining a downwardly extending annular junction portion 52, shaped and dimensioned to fit snugly in around shoulder 30 of outer ring 28 on seating portion 10. In this way, when seating portion 10 and spring bearing portion 12 are assembled as shown in FIG. 2, the centre core 44 arms 46 and intermediate ring 48 are all located at a distance spaced apart from the seating portion 10, thereby defining an open area through which gas can flow, and permitting movement of the valve closure rings 18 and 20 in response to pressure differentials thereacross as described above.

It will be noted that the gas ports 16 in spring bearing portion 12 are defined between the centre core portion 44, arms 46, intermediate ring 48, and outer ring 50, and in fact are located around three essentially circular concentric paths. Such concentric paths are generally speaking off-set with respect to the annular passageways 34 and 36 of seating portion 10, so that gases passing upwardly therethrough and around the rings 18 and 20 may then pass freely through ports 16 with a minimum of obstruction.

In order to provide additional resistance to the stresses imposed on the valve structure, a central support boss 54 is provided on core 44, in a generally cruciform shape in plan, which is adapted to engage the upper surface of centre core 24 and four further generally rectangular support bosses 56 are provided on the radial arms 46 which are adapted to engage the intermediate ring 26 at various points therearound, registering with the radial arms 32.

In order to provide a means for securing the springs 22, a plurality of spring receiving recesses 58 are formed in the core 44, being located around a generally annular path corresponding to the diameter of the inner valve closure ring 18. The centre core 44 is made somewhat oversized in order that it may receive such recesses 58, and it will be noted that the recesses 58 are off-set to one side of the projection of the axes of the radial arms 46, where such axes would pass through core 44. This avoids interruption of such arms 46 which is desirable for reasons to be described below.

In order to provide for the reception of further springs 22, spring mounting blocks 60 are supported, between intermediate ring 48 and outer ring 50, and further such blocks 62 are located on one side of the radial arms 46, adjacent to the junction of intermediate ring 48 therewith.

Blocks 62 are offset from the axes of their respective arms 46 to avoid weakening of such arms.

Blocks 60 are formed integrally with rings 48 and 50, and bridge the spacing between them. In this way maximum support is provided for such blocks 60 without weakening the arms 46 or the remaining structure. All of such blocks 60 and 62 are located around a generally annular path corresponding to the diameter of the outer valve closure ring 20, and are provided with spring receiving recesses 64 therein. Each of the recesses 58 and 64 is provided with a small gas vent opening. This permits gases to blow off any particles which may lodge in the spring recesses.

It will be noted that the springs 22 are of a generally tapering frusto-conical shape, with the larger diameter end seating within the respective recesses 58 or 64, and in this way the remainder of the spring is held out of contact with the surfaces of the recess, thereby substantially prolonging its life.

As best shown in FIGS. 1 and 2, the seating portion 10 and spring bearing portion 12 are assembled together with the springs 22 and rings 18 and 20 in position as shown. Preferably they are permanently bonded or otherwise fastened together, both around the surfaces of the junction portion 52 and shoulder 30, and also at the interfaces between core 24 and central bosses 54 and intermediate ring 26 and bosses 56.

As indicated above, the entire structure of the seating portions 10 and spring bearing portions 12 are made of plastic resin materials in a manner to be described below.

The plastic materials from which the valves according to the invention are manufactured are preferably those known as Sheet Moulding Compound, known in the trade as "SMC.". Such SMC materials comprise reinforcing glass fibres, in a plastic resin base. The plastic resin base is compounded with suitable catalysts, such that at room temperatures it is relatively stable and has an extended shelf life, and is essentially solid so that it may be readily handled, and cut. However when subjected to heat, it becomes mouldable, and the catalysts are activated, so that the material rapidly sets hard. Such SMC material is thus particularly suitable for moulding under heat and pressure in a closed mould. Articles formed in this way are found to have high strength, in some cases equalling that of steel. At the same time, fragments of such material when shattered, are substantially less abrasive then fragments of steel, and thus if such fragments should enter into the cylinders of a compressor, they will do little or no damage.

Figure 7:
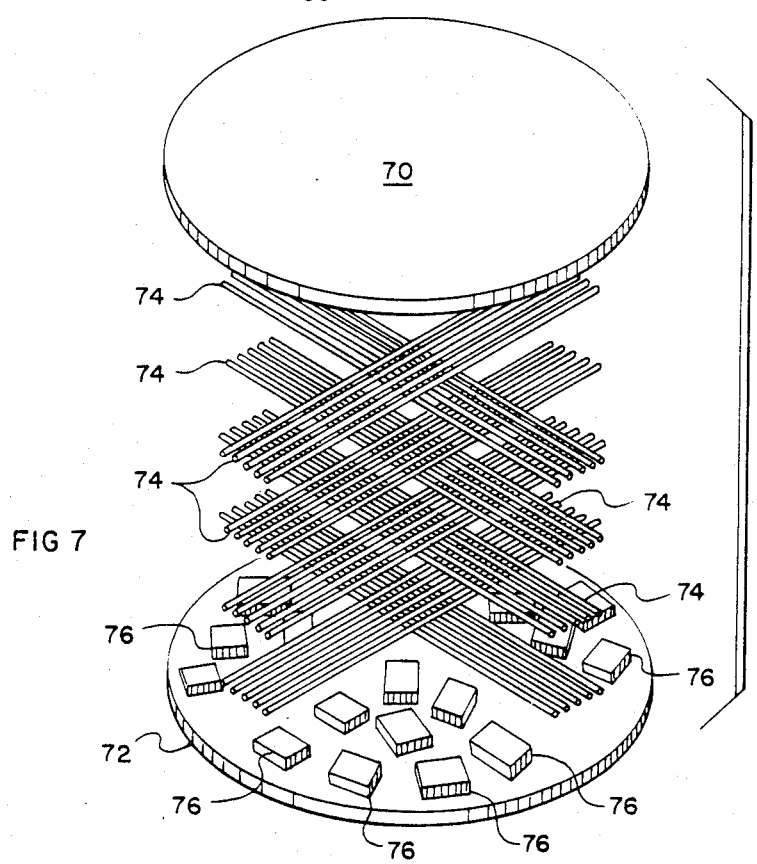
FIG. 7 is a schematic exploded perspective view showing the assembly of the various components prior to moulding.

In the preferred form of construction, the valve body 10 and spring bearing portion 12 of the valve according to the invention are preferably formed of a composite of materials, essentially shown schematically in FIG. 7.

Thus each such portion of the complete valve will comprise upper and lower panel portions 70 and 72 of SMC material, which may be cut into a circular disc shape as shown, or may be cut into any other desired shape for example the shape of a cross, as may be most suitable for fitting in the particular mould.

Sandwiched between the two panel portions 70 and 72 will be groups of unidirectional reinforcing fibres 74. These unidirectional reinforcing fibres may be further filaments of glass fibre material. However, preferably they will be of fibres of carbon, graphite, boron, aramid or even metal, or other reinforcing fibres having a strength greater than that of glass fibres. Each of the groups of fibres 74 will be preferably coated with liquid plastic resin material, incorporating a suitable catalysts, just prior to moulding.

In order to provide sufficient bulk for filling all of the cavities in the mould, additional chunks 76 of SMC material are preferably arranged in the "sandwich" between panel portions 70 and 72.

The composite of such materials is then placed in a suitable mould (see FIG. 9) and subjected to heat and pressure thereby first of all rendering the SMC material mouldable and flowable, and subsequently setting the plastic resin materials. After moulding, which may take place in a 15 minute cycle, for example, depending upon the composition of the SMC material, the article is then removed from the mould and cleaned up and any "flashing" is removed.

The steps involved in moulding of such articles are illustrated schematically with reference to FIGS. 8 and 9, and will be seen to comprise passing a sheet 80 of SMC material between a cutting die D, and stamping panel portions 70 and 72 therefrom in the desired shape, and subjecting the remainder of the SMC material 80 to the action of a chopper C to chop it up into random chunks 76.

Continuous lengths of unidirectional reinforcing fibres 82 are prepared by passing the same through rollers R, applying plastic resin material thereto, and subsequently cutting the same by means of knife K into bundles 74.

The lowermost panel portion 72 is then placed in the bottom of a mould M of a suitable shape. Mould M is provided with suitable heating means, in this place illustrated schematically as electrical heating elements B although heating may be provided by other means such as liquids, or mould M may be placed in an oven.

The reinforcing fibres 74, having been arranged preferably in a suitable jig G (not shown) into the form of a cross, or any other suitable arrangement, are then placed in mould M and the chunks 76 of SMC material are then placed in position, more-or-less as shown in FIG. 9. The upper panel portion 70 is then placed in position after which the upper half of the mould is then closed. The mould is then subjected to heat and pressure causing the SMC material to become sufficiently plastic that it flows into the shape of the mould, after which the plastic resin material is cured and set.

In some cases, where making valves for lower pressure compressors, or where making valves of a smaller size, it may be possible to omit the inclusion of the reinforcing fibres 74. It will however be appreciated that where these reinforcing fibres 74 are incorporated, they will be completely embedded and covered by the SMC material, and will in fact form the radial arms 32, of the valve seating portion 10, or the radial arms 46 of the spring seating portion 12 respectively.

Since the reinforcing fibres 74 provide a substantial portion of the strength of the structure, the spring recesses 58 are all formed in areas which are offset with respect to the arms, in the spring seating portion 12, in the manner described above, so that the recesses 58 and 64 do not cut into such reinforcing fibres 74, which would reduce their effectiveness.

In some cases where it is desired to make an even stronger valve, or where the volume of material is to be reduced for any reason, then it may be desirable to arrange the reinforcing fibres 74 in a generally curved shape as shown schematically in FIG. 10. By arranging the fibres in this manner, the effectiveness of the fibres 74 in providing additional strength is greatly increased.

In certain circumstances to provide articles of even greater strength, it may be desirable to provide reinforcing fibres around the periphery of such an article. Referring to FIG. 11, a circular article, which may be considered as a valve, but may be a variety of different articles, such as a gear wheel or the like may be provided having a core 90, a plurality of radial arms 92, and an outer rim 94. As shown in FIG. 11, openings are defined between arms 92. It will be appreciated that the structure of FIG. 11 is essentially schematic, and a variety of different shapes of such an article may be designed as required.

In the construction of such article, unidirectional fibres 74 extend through the core 90 and along the radial arms 92. Additional unidirectional fibres 74a are arranged around the outer ring 94. The unidirectional fibres 74 and 74a are embedded within moulded SMC material in the manner described above, to form a single homogeneous integral article.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A valve structure of the type comprising a valve seating member defining a plurality of valve openings therethrough, and valve closure means, and a spring bearing member, and a spring means supported thereby for controlling said valve closure means, said seating member comprising a single homogeneous structure defining:

an outer body portion;

a center core portion;

seating means formed on said outer body portion and said center core portion for reception of said closure means thereon;

a plurality of groups of unidirectional reinforcing fibres extending on a linear path from said center core portion into said outer body, being embedded in and completely surrounded by a mouldable plastic resin material and defining reinforced arms joining said outer body portion and said center core portion;

valve openings having sides and ends and formed in said structure with said sides between said outer body portion and said center core portion, said valve openings lying between and terminating with each said end adjacent to but clear of a said group of reinforcing fibres;

and said spring bearing member comprising;

an outer ring portion;

a center bearing portion located spaced inwardly therefrom;

a plurality of groups of reinforcing fibres extending on a linear path from said center bearing portion into said outer ring portion and being embedded in and completely surrounded by a mouldable plastic resin material and defining reinforced arms joining said outer ring portion with said center bearing portion;

a plurality of flow passageways having sides and ends and located with said sides between said center bearing portion and said outer ring portion said flow passageways lying between and terminating with each end adjacent to but clear of a said group of reinforcing fibres;

a plurality of spring housing blocks formed with spring recesses therein for reception of spring means, said blocks being supported between said outer ring portion and said center bearing portion, and supporting spring means in registration with said valve closure means, said blocks being located in offset relation to said groups of fibres of said spring bearing member whereby said spring receiving recesses do not intersect said fibres in said arms.

2. A valve structure as claimed in claim 1 wherein there are at least two said arms in each of said seating member and said bearing portion, and said reinforcing fibres are arranged in a continuous strip from one side through one said arm into the center portion through said other arm to the opposite side.

3. A valve structure as claimed in claim 2 including at least three said arms, wherein said reinforcing fibres are arranged in at least two groups, both said groups passing through said centre portion, and being arranged in at least two different layers whereby the same may form a cross.

4. A valve structure as claimed in claim 3 wherein said mouldable plastic resin material is arranged in upper and lower layers, with said groups of reinforcing fibres enclosed and embedded therebetween.

5. A valve structure as claimed in claim 4 wherein said seating member is generally annular and defines generally semi-annular opening therethrough and including a spring bearing portion formed as a single homogenous structure defining a plurality of passageways therein, and generally annular valve closure means located between said seating member and said spring bearing portion and springs supported in said spring bearing portion engaging said annular valve closure means and forcing same into engagement with said seating member, said closure means being displaceable against said springs upon a predetermined pressure differential occurring thereacross.

6. A valve structure as claimed in claim 5 including support boss means formed on said center bearing portion and extending therefrom and contacting said center core portion of said seating member.

7. A valve structure as claimed in claim 6 including a plurality of further support bosses located on said arms of said spring bearing portion and extending therefrom into contact with said seating member.

8. A valve structure as claimed in claim 7 wherein at least some of said spring receiving block members are located on said arms in offset relation to said arms of said spring bearing portion whereby said spring receiving recesses do not intersect said groups of reinforcing fibres;

and others of said block members are located on said center core portion offset from the axes of said arms.

9. A valve structure as claimed in claim 1 including a first annular rib member concentric with said outer body portion of said valve seating member, and defining valve seating surfaces, and a further generally annular rib member between said outer body portion of said spring bearing member and said core portion.

10. A valve structure as claimed in claim 9 including further spring bearing block members mounted between such outer body portion and such annular rib member of said spring bearing member, and being formed integrally therewith.

11. A valve structure as claimed in claim 1 including further groups of reinforcing fibres arranged in an annular fashion embedded in said outer body portion, and in said outer ring portion.

* * * * *